J. W. OLMSTED.
ICE CREAM FREEZER.

No. 178,186. Patented May 30, 1876.

Witnesses:
Archibald M. Brewster
William H. Sammis

Inventor:
John W. Olmsted

UNITED STATES PATENT OFFICE.

JOHN W. OLMSTED, OF NORTHPORT, NEW YORK.

IMPROVEMENT IN ICE-CREAM FREEZERS.

Specification forming part of Letters Patent No. 178,186, dated May 30, 1876; application filed November 17, 1875.

*To all whom it may concern:*

Be it known that I, JOHN W. OLMSTED, of Northport, in the county of Suffolk and State of New York, have invented a new and useful Improvement in Ice-Cream Freezers; and I hereby declare the following to be a full, clear, and exact description thereof, reference being had to the accompanying drawing, making a part of this specification.

The object of my invention is to construct the freezer in such a manner that the process of freezing the cream can be effected in a very short time, with very little labor, and with a comparatively small quantity of ice, and so that the apparatus can be manufactured and sold at a very small price.

My improvement consists in arranging within the can or vessel within which the cream is placed an upright chamber, located in the center of the said can, and extending from the bottom of the same to its upper rim, which said chamber is left open at its top, and is provided with a perforated bottom, and when the freezer is in use is filled with a mixture of ice and salt, or ice alone, by which means a much larger surface of the cream is exposed to the action of the ice, and, consequently, the freezing is effected much more rapidly and easily, and with a much smaller quantity of ice, than is possible when only the outer surface of the can is in contact with the ice.

Figure 1:
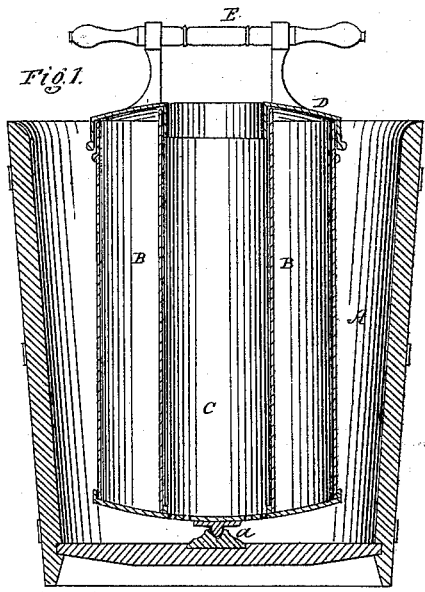
Figure 2:
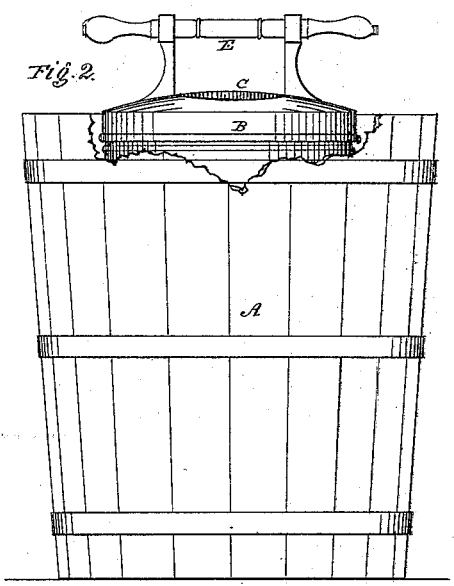
Figure 3:
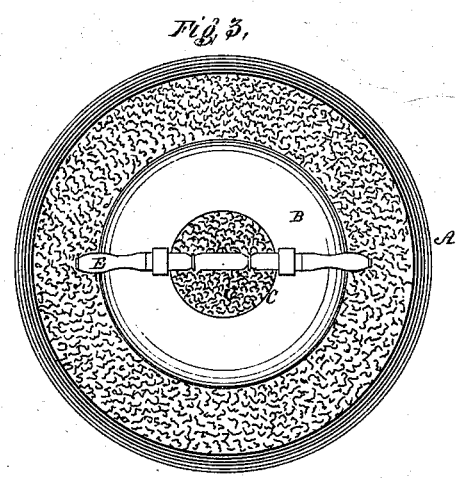

In the accompanying drawing, Figure 1 represents a vertical section of an ice-cream freezer with my improvement. Fig. 2 is a side elevation, and Fig. 3 a plan view, of the same.

Similar letters of reference indicate corresponding parts in all the several figures.

A is the tub or outer vessel, in which the broken ice and salt, or other freezing mixture, is contained, which may be made of wood, or other suitable material, and of convenient form and dimensions. B is the can or vessel in which the cream to be frozen may be placed, which may be made of any suitable sheet metal, and which is placed inside the tub A, and surrounded by the ice, or other freezing substance or mixture, contained in the latter, as in the ordinary manner. This can B I usually make in cylindrical form. C is the inner ice-chamber, which I secure within the can B, as nearly in the center of the same as may be, and which extends from the bottom of the same up to or above its upper edge or rim. The walls of this chamber may be of any suitable sheet metal, and its bottom is perforated, so as to communicate with the interior of the tub A. D is the cover of the can B, which is provided with a central opening, which coincides with the upper end of the chamber C, so that the latter is exposed to the outer air when the can is covered. To the upper surface of the cover or lid D is secured a handle, E, of any suitable form, for rotating the can back and forth in operating the freezer, and on the under side of the bottom plate of the can is a pin or journal, which rests on a step or socket, *a*, located at the center of the bottom of the tub.

When the freezer is to be used the ice, or other freezing substance or mixture, is placed both in the tub A and chamber C, so that the cream is subjected to the action of both, by which means a large proportion of the cream is directly exposed, and the process of freezing is consequently very rapidly effected, with very little labor, and with the use of a very small quantity of ice; and for the same reason, after the cream has been frozen, it is kept in that state with a much smaller quantity of ice than is practicable without the use of my improvement; and I may also state that by means of this improvement a very effective freezer can be manufactured at a very small cost, for the reason that, the freezing being so rapidly effected, the use of gearing is unnecessary for a freezer of ordinary or medium size.

What I claim as my invention is—

In an ice-cream freezer, the combination and arrangement herein shown and described of the central ice-chamber C, open at its top, and having a perforated bottom, with the cream-can B, ice-tub A, and handle E, as and for the purposes herein set forth.

JOHN W. OLMSTED.

Witnesses:
ARCHIBALD W. BREWSTER,
WILLIAM H. SAMMIS.